United States Patent
Vattaneo et al.

(10) Patent No.: US 10,619,556 B2
(45) Date of Patent: Apr. 14, 2020

(54) INTERNAL COMBUSTION ENGINE WITH GAS FEEDING SYSTEM

(71) Applicant: C.R.F. Società Consortile per Azioni, Orbassano, Turin (IT)

(72) Inventors: Francesco Vattaneo, Turin (IT); Dario Rossi, Turin (IT); Roberto Saretto, Turin (IT); Roberto Vitalesta, Turin (IT); Massimiliano Garganese, Turin (IT); Massimo Ferrera, Turin (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 71 days.

(21) Appl. No.: 16/042,166

(22) Filed: Jul. 23, 2018

(65) Prior Publication Data

US 2019/0032544 A1 Jan. 31, 2019

(30) Foreign Application Priority Data

Jul. 25, 2017 (EP) .................................... 17183064

(51) Int. Cl.
*F02B 19/00* (2006.01)
*F02B 19/10* (2006.01)
(Continued)

(52) U.S. Cl.
CPC ...... *F02B 19/1085* (2013.01); *F02B 19/1052* (2013.01); *F02B 19/1061* (2013.01);
(Continued)

(58) Field of Classification Search
CPC ...... F02B 19/1061; F02B 19/12; F02B 19/00; F02M 21/0275; F02M 21/0281; F02M 21/0284; F02P 13/00
See application file for complete search history.

(56) References Cited

U.S. PATENT DOCUMENTS 3,945,365 A * 3/1976 Regueiro ............... F02B 19/12
123/265
4,009,692 A * 3/1977 Sakai ................... F02B 19/1014
123/259

(Continued)

FOREIGN PATENT DOCUMENTS

EP 1209336 A2 5/2002
EP 2927458 A1 10/2015

OTHER PUBLICATIONS

Ashish Shah et al: "Effect of Pre-Chamber Volume and Nozzle Diameter on Pre-Chamber Ignition in Heavy Duty Natural Gas Engines", SAE Technical Paper Series, vol. 1, Apr. 21, 2015.
(Continued)

*Primary Examiner* — Thomas N Moulis
(74) *Attorney, Agent, or Firm* — RMCK Law Group, PLC

(57) ABSTRACT

An engine is equipped with a gas feeding system, including main gas injectors each associated with an intake duct of a respective engine cylinder, a gas distribution manifold communicating with said main injectors, a gas tank, connected to the manifold, where pressurized gas is accumulated, a controlled pressure valve interposed between the tank and manifold, and a control unit for controlling the pressure valve to establish a gas pressure in the manifold. A spark plug of each cylinder is mounted within a support body that defines a combustion pre-chamber and a channel for auxiliary gas injection within the pre-chamber, communicating with a respective auxiliary gas injector. The auxiliary gas injectors are in communication with the manifold, downstream of the pressure valve. In the channel, a non-return valve and a restricted passage are provided in series, providing for passage of gas flow proportional to a volume of the pre-chamber.

6 Claims, 5 Drawing Sheets

Figure 1:
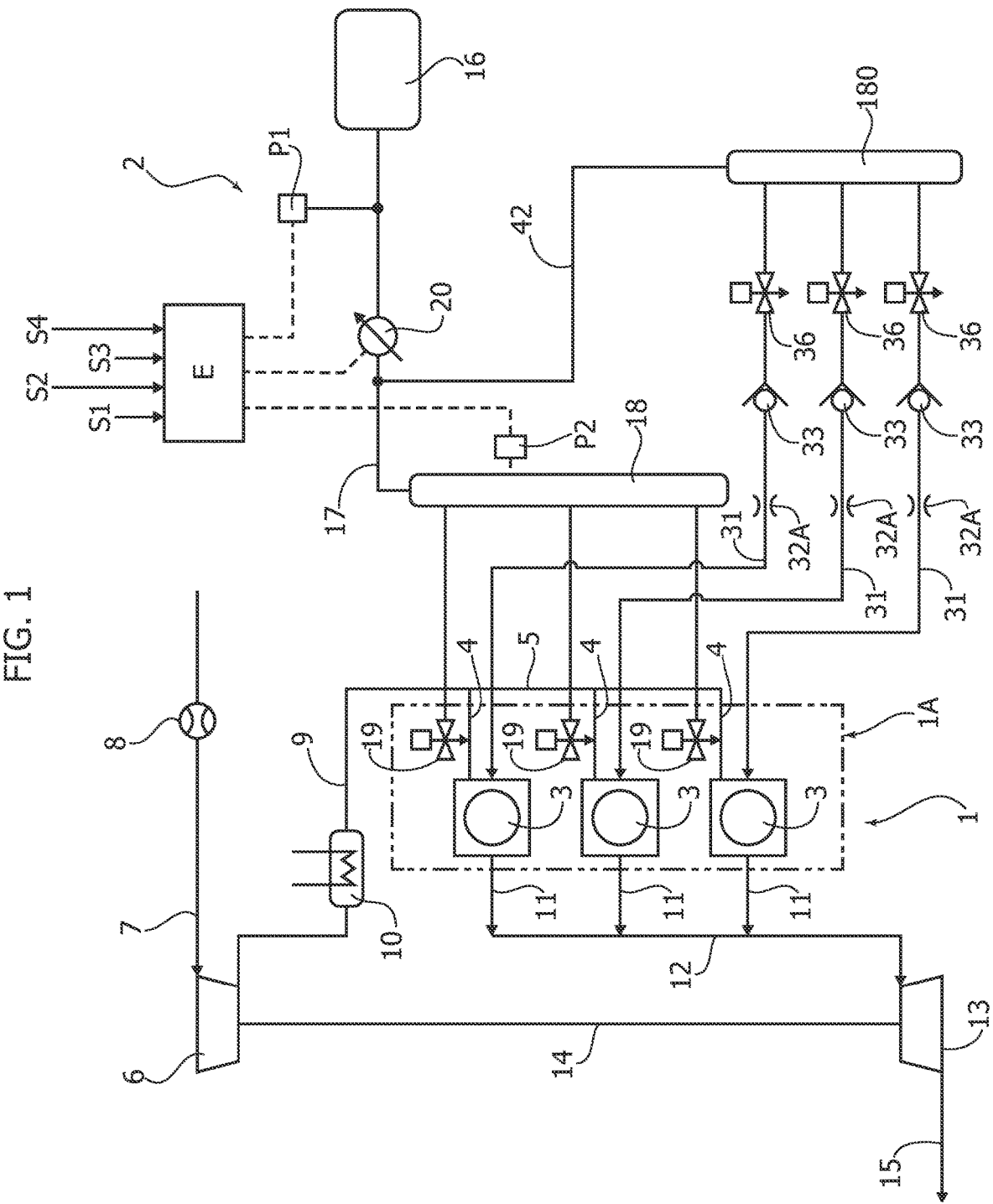

(51) Int. Cl.
*F02B 19/12* (2006.01)
*F02M 21/02* (2006.01)
*F02P 13/00* (2006.01)

(52) U.S. Cl.
CPC ......... *F02B 19/12* (2013.01); *F02M 21/0275* (2013.01); *F02M 21/0281* (2013.01); *F02P 13/00* (2013.01); *F02M 21/0284* (2013.01)

(56) References Cited

U.S. PATENT DOCUMENTS

| | | | | |
|---|---|---|---|---|
| 4,029,072 | A * | 6/1977 | Goto | F02B 19/12 123/287 |
| 4,124,003 | A * | 11/1978 | Abe | F02B 17/00 123/169 EL |
| 4,287,862 | A * | 9/1981 | Noguchi | F02B 5/00 123/146.5 A |
| 5,555,868 | A * | 9/1996 | Neumann | F02B 19/1023 123/275 |
| 5,611,307 | A * | 3/1997 | Watson | F02B 19/1014 123/254 |
| 5,752,481 | A * | 5/1998 | Faulkner | F02B 19/1009 123/294 |
| 7,278,387 | B2 * | 10/2007 | Gong | F02P 15/08 123/169 MG |
| 2003/0196634 | A1 * | 10/2003 | Lausch | F02B 1/12 123/260 |
| 2009/0319156 | A1 * | 12/2009 | Fujikawa | F02B 23/104 701/103 |
| 2011/0232589 | A1 * | 9/2011 | Blank | F02B 19/10 123/3 |
| 2012/0299459 | A1 * | 11/2012 | Sakakura | H01T 13/32 313/141 |
| 2013/0054124 | A1 * | 2/2013 | Stoll | F02D 41/22 701/112 |
| 2014/0165958 | A1 * | 6/2014 | Lee | F02B 19/12 123/260 |
| 2014/0196686 | A1 * | 7/2014 | Coldren | F02B 19/12 123/299 |
| 2015/0068489 | A1 * | 3/2015 | Bunce | F02B 19/1057 123/262 |
| 2016/0003117 | A1 * | 1/2016 | Cook | F01N 13/107 60/321 |
| 2016/0053673 | A1 | 2/2016 | Sotiropoulou et al. | |
| 2016/0195007 | A1 | 7/2016 | Kim | |
| 2016/0195051 | A1 * | 7/2016 | Konczol | F02B 19/1014 123/297 |
| 2016/0245151 | A1 * | 8/2016 | Yuuki | F02B 19/08 |
| 2016/0252005 | A1 * | 9/2016 | Jacob | F02M 21/0242 137/537 |
| 2016/0252045 | A1 * | 9/2016 | Jacob | F02M 21/0269 123/260 |
| 2016/0363041 | A1 | 12/2016 | Moffat et al. | |
| 2017/0101948 | A1 * | 4/2017 | Kunkel | F02D 41/0085 |
| 2017/0284320 | A1 * | 10/2017 | Holst | F02P 5/1502 |
| 2018/0066571 | A1 * | 3/2018 | Boyde | F02M 21/0272 |
| 2018/0100479 | A1 * | 4/2018 | Shah | H01T 13/60 |
| 2018/0128157 | A1 * | 5/2018 | VanDerWege | F02B 19/04 |
| 2018/0166862 | A1 * | 6/2018 | Rabhi | H01T 13/24 |
| 2019/0323415 | A1 * | 10/2019 | Corrigan | F02B 23/08 |

OTHER PUBLICATIONS

European Search Report dated Nov. 22, 2017, 3 pages.

* cited by examiner

INTERNAL COMBUSTION ENGINE WITH GAS FEEDING SYSTEM

CROSS REFERENCE TO RELATED APPLICATION

This application claims priority to European Patent Application No. 17183064.9 filed on Jul. 25, 2017, the entire disclosure of which is incorporated herein by reference.

FIELD OF THE INVENTION

The present invention relates to spark-ignition internal combustion engines provided with a gas feeding system, in particular a system for feeding CNG (Compressed Natural Gas) or methane, of the type comprising:
- an engine block with a plurality of cylinders,
- a cylinder head defining a combustion chamber associated with each cylinder,
- a spark plug associated with each cylinder,
- a plurality of electromagnetically-controlled main gas injectors, each associated with an intake duct of a respective cylinder of the engine,
- a gas distribution manifold, communicating with said main gas injectors,
- a gas tank connected to the distribution manifold, where gas under pressure is accumulated,
- an electronically-controlled pressure regulation valve, interposed in the connection between the gas tank and the aforesaid distribution manifold, and
- an electronic control unit configured to control the opening and closing of each main gas injector according to the operating conditions of said gas feeding system and according to the operating conditions of the engine and for controlling said pressure regulation valve in order to establish a gas pressure in the aforesaid gas distribution manifold, which is determined according to the operating conditions of said gas feeding system and according to the operating conditions of the engine.

PRIOR ART

An internal combustion engine of the type indicated above is, for example, described and illustrated in EP 1 209 336 A2, filed by the same Applicant. In the system illustrated in this document, the pressure regulation valve is preferably controlled in a Pulse Width Modulation (PWM) mode to take the gas pressure in the distribution manifold to a value that is determined each time depending both on the operating conditions of the gas feeding system (such as the pressure of the gas leaving the tank, which in turn is a function of the filling level of the tank) and on the operating conditions of the engine, including, in particular, the engine load (position of the accelerator pedal) and the engine rotational speed. The electronic control unit can, for example, use pressure maps that give the required pressure value in the distribution manifold, according to the operating conditions of the gas feeding system and the engine, and can consequently control the pressure regulation valve according to the conditions detected, to establish the required gas pressure level in the gas distribution manifold.

In this way, the gas injection into the cylinders of the engine can be controlled in an optimal way, by adjusting both the opening time of each gas injector and the value of the gas pressure in the distribution manifold.

In recent years, due to the necessity of maximizing the engine efficiency, minimizing fuel consumption and reducing harmful exhaust emissions, it has been proposed to arrange the spark plug of each cylinder within a support body that defines a combustion pre-chamber, having a first end facing the electrodes of the spark plug, and a second end communicating with the combustion chamber through a plurality of orifices. The support body of the spark plug also defines a channel for auxiliary gas injection into the combustion pre-chamber, having a first end opening out in the combustion pre-chamber, adjacent to the spark plug, and an opposite end connected to a respective electromagnetically-controlled auxiliary gas injector, mounted on the cylinder head in a remote position with respect to said combustion pre-chamber. A solution of this type is, for example, described and illustrated in US 2016/0363041 A1.

With the aforesaid arrangement, it is possible to inject gas into the combustion pre-chamber and ignite it by means of the spark plug. The combustion then propagates into the main combustion chamber through the orifices for communication between the combustion pre-chamber and the main combustion chamber. In these solutions, it is possible to fill the main combustion chamber with a poor mixture of air and fuel, obtained by injecting fuel into the cylinders through the main injectors. "Poor" mixture means a mixture in which for example the ratio $\lambda$ between the actual air/fuel ratio and the stoichiometric ratio amounts approximately to 2. Since the stoichiometric mixture is about 17.2, this means that, for example, the mixture actually implemented is approximately 34.

Solutions of this type that have been implemented thus far are, however, not optimized for operation with gas, and are not fully satisfactory during operation.

An engine according to the preamble of claim 1 is known from the Article of Ashish Shah et al. "Effect of Pre-Chamber Volume and Nozzle Diameter on Pre-Chamber Ignition in Heavy Duty Natural Gas Engines", SAE Technical Paper Series. Vol. 1, 21 Apr. 2015 (2015-04-21), XP055427250, US—ISSN:0148-7191, DOI: 10.4271/2015-01-0867.

OBJECT OF THE INVENTION

The object of the present invention is that of providing an engine with a gas feeding system of the type indicated at the beginning of the present description, which is capable of operating with extremely low gas consumption and high operational efficiency.

SUMMARY OF THE INVENTION

In view of achieving the aforesaid object, the present invention is directed to an internal combustion engine having all of the characteristics of claim 1.

During operation, the electronic control unit activates, for each cylinder, the auxiliary gas injector, the spark plug and the main gas injector, in order to obtain the following operating sequence:
- the auxiliary gas injector injects a flow of gas into the combustion pre-chamber; this injection can take place in the intake stage of the cycle of each cylinder, or even in the subsequent compression stage;
- during the compression stage in the cylinder, the piston rises in the cylinder, pushing a certain amount of air into the pre-chamber through the aforesaid orifices,
- the gas previously injected into the pre-chamber is compressed, enabling entry into the pre-chamber of said amount of air; the air/fuel ratio thus obtained is a rich ratio, for example, with a $\lambda$ between 0.6 and 0.7, the spark plug ignites the mixture in the combustion pre-chamber, the combustion propagates from the combustion pre-chamber to the combustion chamber, through the orifices for communication of the combustion pre-chamber with the combustion chamber, the main combustion chamber is previously filled with a poor mixture of air and gas (for example, with λ approximately equal to 2), by injection of gas into the intake duct, by means of the aforesaid main injector.

In this way, the engine according to the invention can achieve a series of important advantages: first of all, the main gas injectors as well as the auxiliary gas injectors communicate with the gas distribution manifold, which can be formed as a single body or even have separate intercommunicating bodies. Secondly, the electronic control unit establishes the ideal gas pressure level in the distribution gas manifold, communicating with both the main injectors and with the auxiliary injectors; the pressure level being calculated according to the operating conditions of the engine (engine load and engine rotational speed) and according to the operating conditions of the gas feeding system. At the same time, ignition of the gas in the combustion pre-chamber allows for the provision of a poor mixture in the cylinder, so as to minimize fuel consumption. Furthermore, each new gas injection into each combustion pre-chamber carries out a scavenging of the pre-chamber, allowing any unburned fuel from the previous combustion to flow into the cylinder.

Another advantage of the invention is that the above-described arrangement can also be easily obtained, by means of simple modifications, in a cylinder head originally designed with a conventional configuration, without combustion pre-chambers and without auxiliary injectors.

Another advantage of the invention lies in that it is possible to use standard injectors that are identical to each other, both for the main injectors and for the auxiliary injectors, since the aforesaid restricted passage in the auxiliary injection channel limits the gas flow to a value proportional to the volume of the combustion pre-chamber.

Preferably, the volume of the combustion pre-chamber is less than 3% of the volume of the main combustion chamber of each cylinder. Still preferably, the aforesaid combustion pre-chamber has a main portion of elongated cylindrical shape having an L/D ratio between its length and its diameter between 3 and 6. Still preferably, the orifices for communication between the combustion pre-chamber and the main combustion chamber are inclined with respect to the main axis of said elongated combustion pre-chamber by an angle from 500 to 700 and preferably equal to 60°.

DETAILED DESCRIPTION OF THE EMBODIMENTS OF THE INVENTION

Figure 2:
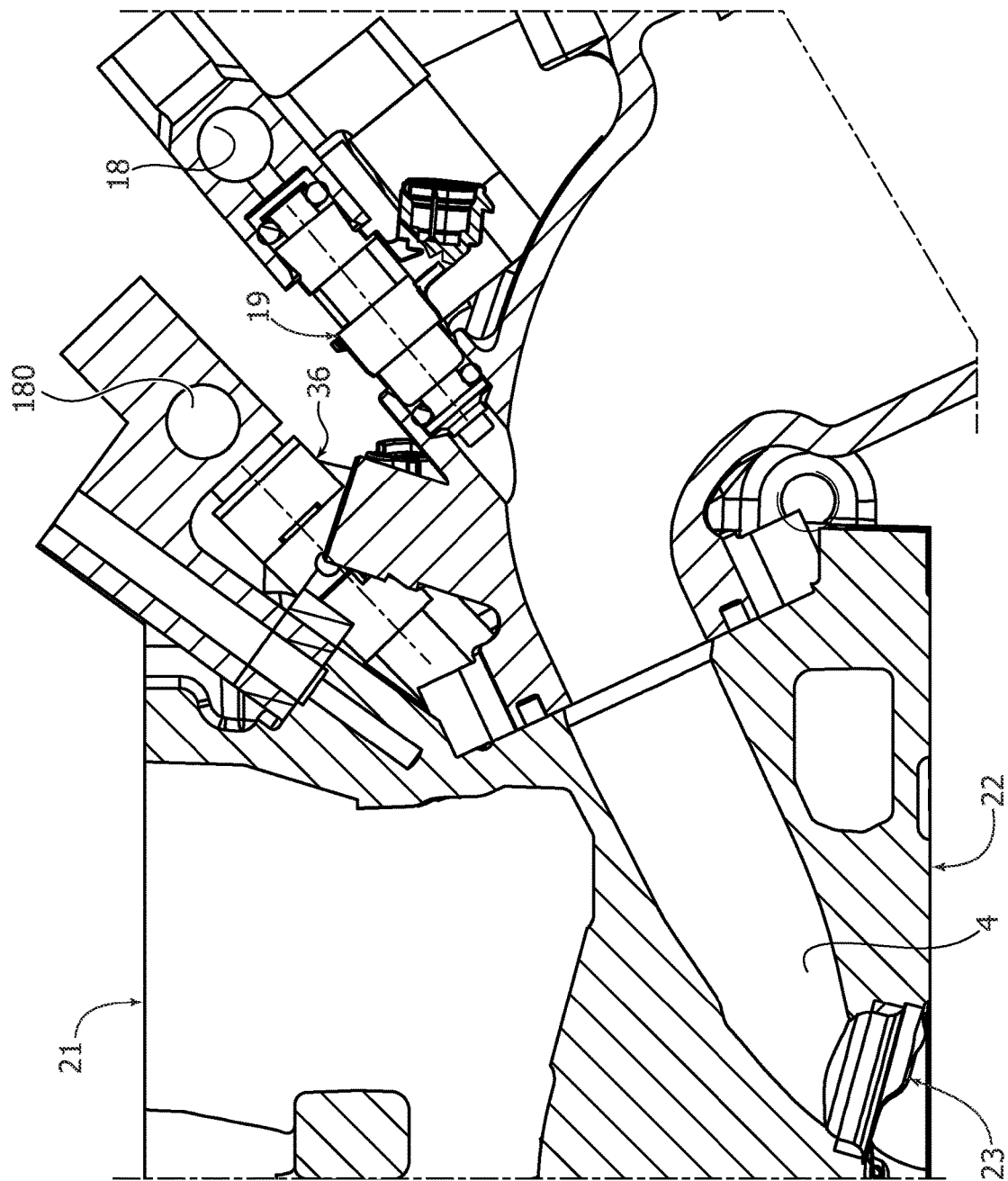
Figure 3:
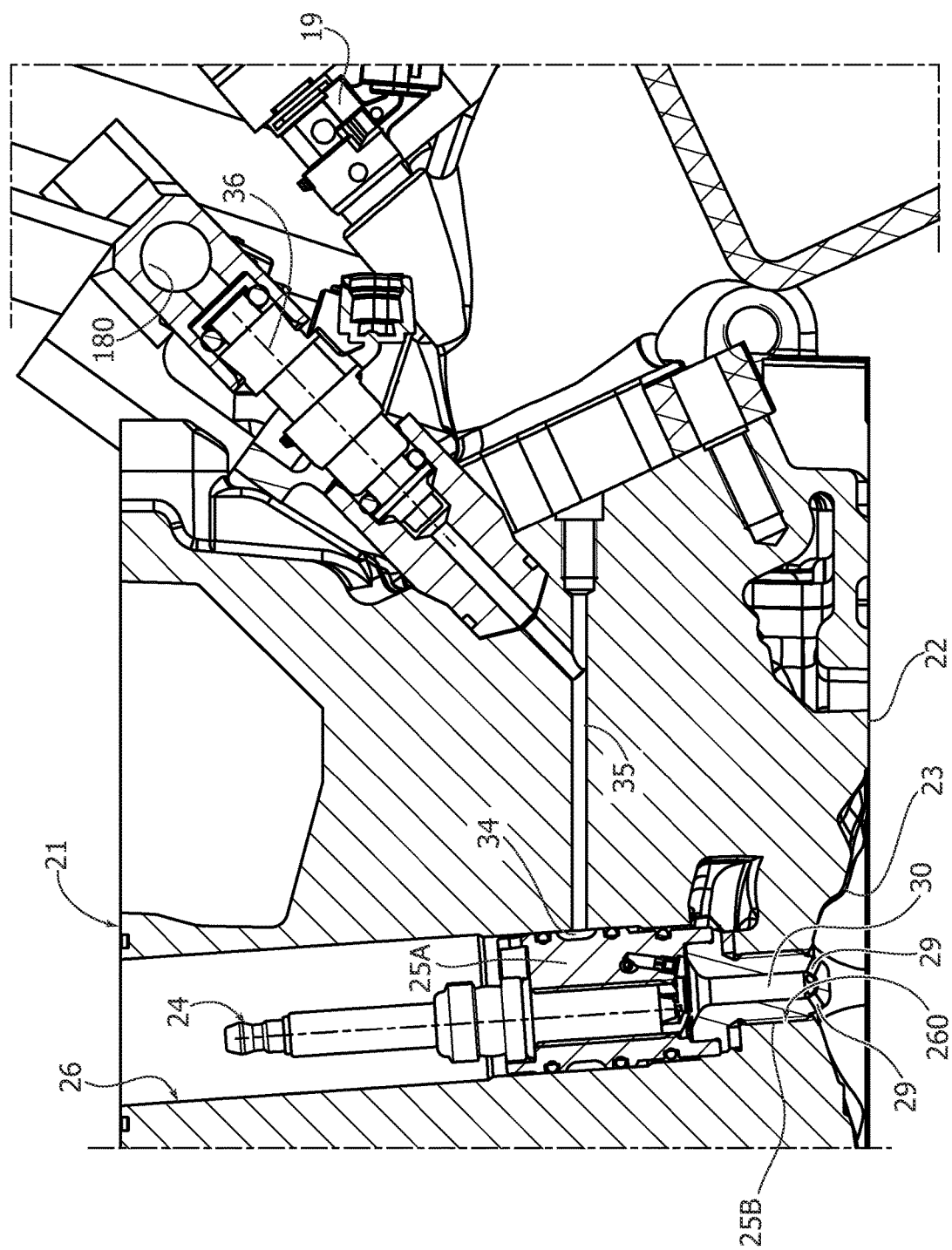
Figure 4:
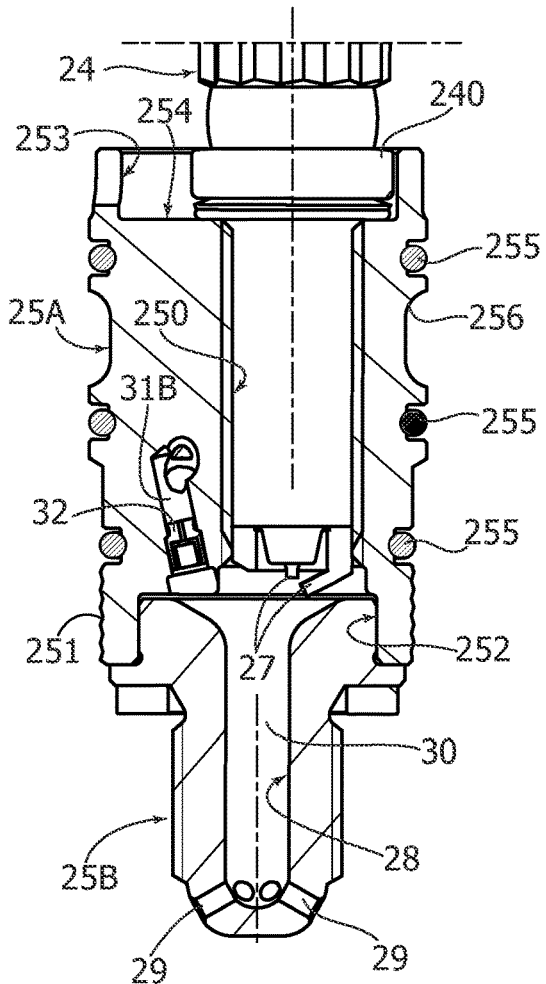
Figure 5:
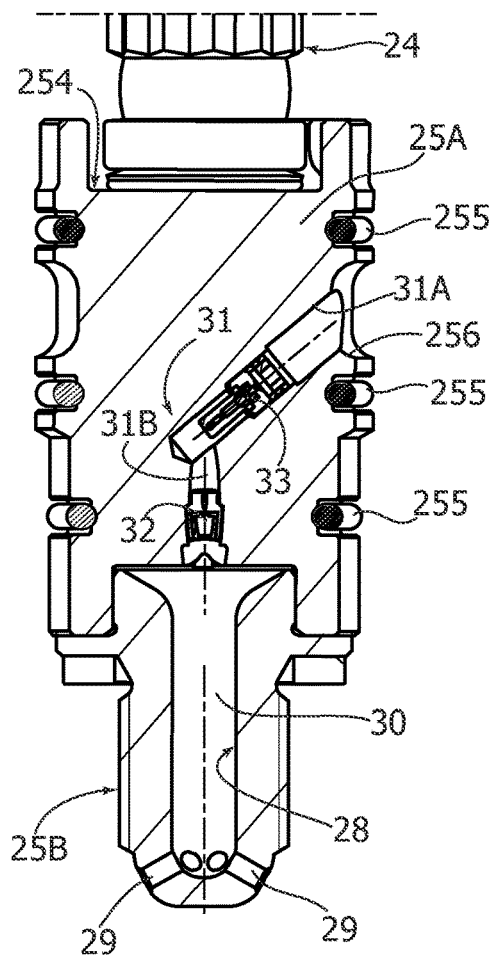
Figure 6:
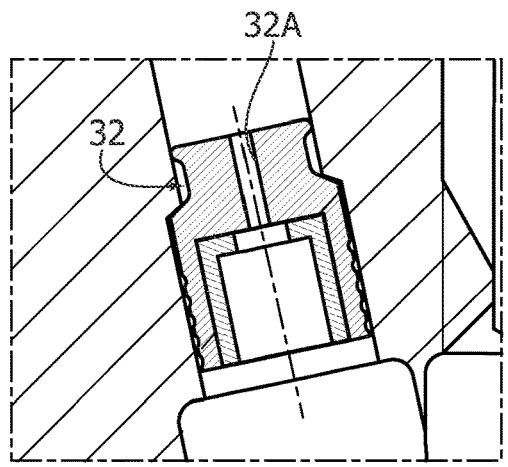
Figure 7:
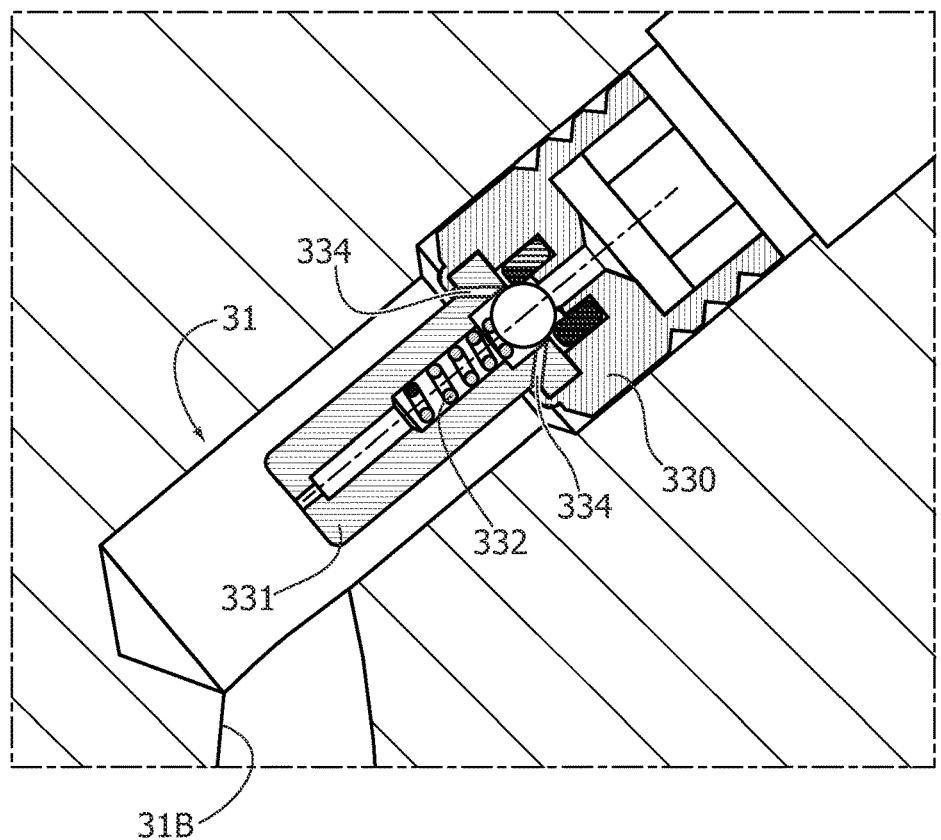
Figure 8:
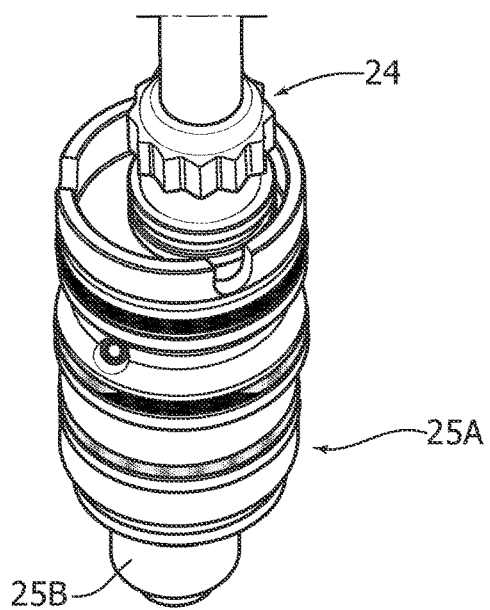

Further characteristics and advantages of the invention will become apparent from the description that follows with reference to the attached drawings, provided purely by way of non-limiting example, wherein:

FIG. 1 is a diagram of an internal combustion engine equipped with a gas feeding system, according to the present invention, FIG. 2 is a partial cross-sectional view of a cylinder head of an embodiment of the engine of FIG. 1, FIG. 3 is another partial cross-sectional view of the cylinder head of FIG. 2, FIGS. 4 and 5 are two different views, in cross-section and on an enlarged scale, of a spark plug-pre-chamber assembly shown in FIG. 3, and FIG. 6 illustrates an enlarged detail of FIG. 4, FIG. 7 illustrates an enlarged detail of FIG. 5, and FIG. 8 is a perspective view of the spark plug-pre-chamber assembly shown in FIGS. 4 and 5.

In FIG. 1, the reference numeral 1 indicates, in its entirety, a multi-cylinder internal combustion engine (in the example illustrated, a three-cylinder engine) provided with a gas feeding system, in particular a system for feeding CNG (Compressed Natural Gas) or methane, the system being indicated in its entirety with reference number 2.

The engine 1 has a block 1A in which the cylinders 3 are formed. Each of the cylinders 3 has at least one intake duct 4 that receives air from an intake manifold 5. The illustrated example refers to an internal combustion engine of the turbocharged type, in which the intake manifold 5 receives compressed air from a compressor 6. The compressor 6 receives air through an air supply duct 7 in which an air filter 8 is interposed. The outlet for the compressed air from the compressor 6 communicates with the intake manifold 5 through a duct 9 in which a heat exchanger 10 is interposed, for cooling the air fed to the engine.

Each of the cylinders 3 has at least one exhaust duct 11 communicating with an exhaust manifold 12. The exhaust gases leaving the exhaust manifold 12 are used to drive a turbine 13 mechanically connected to the compressor 6 by means of a shaft 14, in order to actuate the compressor 6. The outlet of the exhaust gases from the turbine 13 communicates with an exhaust line 15.

The gas for feeding the internal combustion engine 1 is accumulated under high pressure (for example 200 bar) in a gas tank 16. The outlet of the tank 16 is equipped with a conventional-type interceptor valve (not illustrated). The tank 16 outlet is also connected via a line 17 to a distribution manifold 18 (also called "rail") that communicates with a plurality of main gas injectors 19 mounted on the engine 1, to inject gas into respective air supply ducts 4. The main injectors 19 are controlled by an electronic control unit E. In the line 17 that connects the outlet of the tank 16 to the distribution manifold 18, an electronically-controlled pressure regulation valve 20 is interposed to regulate the gas pressure in the distribution manifold 18.

According to the prior art, the electronic control unit E controls the pressure regulation valve 20, preferably in a PWM mode, to establish a pressure value in the distribution manifold 18, which is determined each time according to the operating conditions of the gas feeding system and the operating conditions of the engine 1. To this end, the electronic control unit receives a plurality of signals S1, S2, S3, S4, etc., indicative of the operating parameters of the engine and gas feeding system, such as the engine load (position of the accelerator pedal), the engine rotational speed, the pressure in the distribution manifold 18, the pressure of the gas leaving the tank 16, etc. To this end, the system comprises a pressure sensor P1 at the outlet of the tank 16, and a pressure sensor P2 capable of detecting the pressure in the rail 18.

Referring now to FIGS. 2-6, numeral 21 indicates the body of the cylinder head of the engine 1, the lower surface 22 of which has a cavity 23 at each cylinder 3 of the engine block, defining the main combustion chamber associated with the cylinder.

Associated with each cylinder 3, a spark plug 24 is provided (in the illustrated example, a spark plug with a diameter of 10 mm). The spark plug 24 associated with each cylinder is mounted, for example screwed, within an axial cylindrical cavity 250 of a cylindrical body 25A forming the upper part of a support 25 carrying the spark plug 24. The upper body 25A is, in turn, mounted, for example by screwing, within a cavity 26 formed in the cylinder head 21. In the illustrated example, the body 25A has a lower portion having a threaded outer surface 251 for engaging a corresponding threaded portion of the surface of the lower end portion of the cavity 26. The body 25A has an outer surface with circumferential grooves that receive sealing rings 255, which are in contact with the cavity surface 26.

As clearly shown in FIGS. 4 and 5, the axial cavity 250 of the upper body 25A extends at its lower end into an enlarged cylindrical cavity 252, opening out at the lower end of the body 25A. Moreover, the same axial cavity 250 of the upper body 25A extends at its upper end into an enlarged cylindrical cavity 253, opening out at the upper end of the body 25A. The enlarged cavity 253 defines an abutment surface 254 for an enlarged portion 240 of the body of the spark plug 24. The arrangement is such that when the spark plug rests on the abutment surface 254, its electrodes face the enlarged cavity 252 at the lower end of the body 25A. In this cavity 252, the upper end portion of a body 25B defining the lower part of the support 25 is mounted, for example, by an interference-fit.

The body 25B is also cylindrical and has an axial cylindrical cavity 28, which is blind at its lower end. The bottom wall of the body 25B is dome-shaped and has a circumferential series of orifices 29 for communication the cavity 28 to the combustion chamber 23. The orifices 29 have axes inclined with respect to the axis of the body 25B by an angle preferably between 50° and 70°, and preferably equal to 60°.

In the illustrated example, the upper end of the axial cavity 28 has a flared shape.

In the assembled condition, in which the bodies 25A and 25B are rigidly connected to each other, their cavities 252 and 28 define a substantially elongated combustion pre-chamber 30, having one end facing the spark plug electrodes 27 and the opposite end communicating with the main combustion chamber through the orifices 29.

The body 25B is inserted through an end portion 260 of the cavity 26 formed in the head, which leads into the combustion pre-chamber 23.

As an alternative to the solution illustrated in which the body 25A is screwed into the cavity 26, it is possible to envisage that the entire assembly formed of the bodies 25A, 25B and the spark plug 24 is secured into position by screwing the body 25B into the cavity 260. In this case, the outer surface of the body 25B and the surface of the cavity 260 have threaded portions cooperating with each other.

In the preferred embodiment, the volume of the combustion pre-chamber 30 is less than 3% of the volume of the main combustion chamber 23 of each cylinder.

The predominant portion of the combustion pre-chamber is defined by the elongated cylindrical cavity 28 of the lower body 25B. This cavity preferably has an L/D ratio between its length and its diameter from 3 to 6.

In the support body 25A, a channel for auxiliary feeding of gas into the combustion pre-chamber 30 is also formed, which is indicated by the reference 31. The channel 31 extends through the support body 25A, alongside the cavity 250 that receives the spark plug 24. The channel 31 has two portions 31A, 31B arranged in an inclined manner to each other. The upper portion 31A leads onto a circumferential groove 256 of the outer surface of the body 25A. The lower portion 31B leads onto the enlarged cavity 252 defining the upper part of the combustion pre-chamber.

In the lower portion 31B of the channel 31, a bushing 32 is inserted with a reduced diameter hole 32A (see FIG. 6) defining a restricted passage for the gas flow. The restricted passage 32A has a diameter D so that the D/V ratio between said diameter and the volume of the combustion pre-chamber is between $3 \times 10^{-4}$ and $6 \times 10^{-4}$ mm$^{-2}$, in order to allow the passage of a gas flow proportional to the volume of the combustion pre-chamber 30.

In the upper portion 31A of the channel 31, a non-return valve 33 is inserted, which allows gas to flow only towards the combustion pre-chamber 30. FIG. 7 illustrates an exemplary embodiment of the non-return valve 33. In this example, the valve 33 has a body 330 mounted with an interference-fit within the portion 31A of the channel 31. The body 330 extends into a portion of reduced diameter 331, having an axial through-hole. The portion 331 contains a helical spring 332 that pushes a ball 333 against a valve seat defined by a sealing ring mounted within the body 330. When a gas flow occurs in the channel 31 towards the pre-chamber 30, the ball 333 retracts, compressing the spring 332, and the gas flows through passages 334 formed in the body 331. When there is a flow of gas coming from the pre-chamber, this flow finds the passage closed by ball 333.

The auxiliary gas feeding channel 31 communicates with a circumferential chamber 34 (FIG. 3) defined by the circumferential groove 256 and the surface of the cylindrical cavity 26. The chamber 34, in turn, communicates with a channel 35 formed in the cylinder head serving for the communication of the auxiliary gas feeding channel 31 with an auxiliary gas injector 36, which is mounted in the head 21 (FIG. 3).

Returning to the diagram of FIG. 1, therefore, in the engine according to the invention, an auxiliary gas injector 36 is also associated with each cylinder 3 of the engine.

The auxiliary gas injectors 36 associated with the cylinders 3 of the engine, and in particular associated with the combustion pre-chambers 30 of the cylinders of the engine 3, also communicate with the distribution manifold 18. In the example illustrated in FIG. 1, the three auxiliary injectors 36 communicate with a separate manifold body 180 which, in turn, communicates through a line 42 with the manifold 18 of the main injectors 19. The line 42 communicates with the manifold 18 downstream of the pressure regulation valve 20, with reference to the flow direction of the gas leaving the tank 16. Therefore, the pressure regulation valve 20 establishes the same pressure both in the manifold 18 and in the manifold 180.

Of course, the electronic control unit E is configured to control both the pressure regulation valve 20, in order to control the pressure value of the gas in the distribution manifolds 18 and 180, and the main injectors 19 and the injectors 36, in order to regulate the opening and closing of each of these injectors. Finally, the electronic control unit E also controls the activation of the ignition spark plugs 24 associated with the cylinders of the engine.

The diagram of FIG. 1 shows the non-return valve 33 and the restricted passage 32A arranged in series along each auxiliary gas feeding channel in the combustion pre-chambers.

FIG. 2 shows the arrangement of a main injector 19 associated with an intake duct 4. FIG. 2 also illustrates the rail 18. FIGS. 2 and 3 show the auxiliary injector 36 and the rail 180.

The restricted passage 32A has a diameter D so that the D/V ratio between said diameter and the volume of the combustion pre-chamber is between $3 \times 10^{-4}$ and $6 \times 10^{-4}$ mm$^{-2}$, in order to allow the passage of a gas flow proportional to the volume of the combustion pre-chamber 30.

During operation, the electronic control unit activates—for each cylinder—the auxiliary gas injector, the spark plug 24 and the main gas injector 19, in order to obtain the following operating sequence:

- the auxiliary gas injector 36 injects a flow of gas into the combustion pre-chamber 30; this injection can take place in the intake stage of each cylinder, or even in the subsequent compression stage;
- during the compression step in the cylinder, the piston rises in the cylinder, pushing a certain amount of air into the pre-chamber 30 through the aforesaid orifices 29,
- the gas previously injected into the pre-chamber 30 is compressed, enabling entry of said amount of air into the pre-chamber; the mixture thus obtained is a rich mixture, for example with λ between 0.6 and 0.7,
- the spark plug ignites the mixture in the combustion pre-chamber,
- the combustion propagates from the combustion pre-chamber 30 to the combustion chamber 23, through the orifices 29 for communication of the combustion pre-chamber 30 with the combustion chamber 23,
- the main combustion chamber 23 is previously filled with a poor mixture of air and gas (for example, with λ approximately equal to 2), by injection of gas into the intake duct (FIG. 2) by means of the aforesaid main injector 19.

As already indicated, the engine according to the invention can achieve a series of important advantages: first of all, the main gas injectors 19 as well as the auxiliary gas injectors 36 communicate with the gas distribution manifold 18, which can be formed as a single body or with separate bodies 18, 180, communicating with each other, as illustrated herein. Secondly, the electronic control unit establishes the ideal gas pressure level in the distribution gas manifold 18,180, which communicates both with the main injectors 19 and with the auxiliary injectors 36, the pressure level being calculated according to the operating conditions of the engine (engine load and engine rotational speed) and according to the operating conditions of the gas feeding system. At the same time, the ignition of the gas in the combustion pre-chamber allows the provision of a poor mixture in the cylinder, in order to minimize fuel consumption. Furthermore, each new injection of gas into each combustion pre-chamber carries out a scavenging of the pre-chamber, allowing any unburned fuel from the previous combustion to flow into the cylinder.

Another advantage of the invention is that the above-described arrangement can also be easily obtained, by means of simple modifications, in a cylinder head originally designed with a conventional configuration, without combustion pre-chambers and without auxiliary injectors.

Another advantage of the invention lies in the fact that it is possible to use standard injectors that are identical to each other, both for the main injectors and for the auxiliary injectors, since the aforesaid restricted passage in the auxiliary injection channel limits the gas flow to a value proportional to the volume of the combustion pre-chamber.

Naturally, without prejudice to the principle of the invention, the details of construction and the embodiments may vary widely with respect to those described and illustrated purely by way of example, without departing from the scope of the present invention.

What is claimed is:

1. A spark-ignition internal combustion engine having a system for feeding a gas, the engine comprising:

- an engine block with a plurality of cylinders and a cylinder head defining a main combustion chamber associated with each cylinder,
- an ignition spark plug associated with each cylinder,
- a plurality of electromagnetically-controlled main gas injectors, each associated with an intake duct of a respective cylinder of the engine,
- a gas distribution manifold, communicating with said main gas injectors,
- a gas tank connected via a connection to the distribution manifold, where gas under pressure is accumulated, wherein:

the spark plug of each cylinder is mounted within a support body that is mounted within a cavity of said cylinder head opening out in said main combustion chamber, said support body defines a combustion pre-chamber having a first end facing electrodes of the respective spark plug and a second end communicating with the respective main combustion chamber through a plurality of orifices, said support body also defines a channel for auxiliary gas injection into said combustion pre-chamber, said channel having a first end opening out in said combustion pre-chamber, adjacent to said spark plug, said channel being in communication with a respective auxiliary electromagnetically-controlled gas injector, mounted on the cylinder head in a remote position with respect to said combustion pre-chamber, and in said auxiliary gas injection channel associated with each combustion pre-chamber there are arranged in series a non-return valve which enables gas to flow only towards the combustion pre-chamber, and a restricted passage, wherein said engine further comprises:

an electronically-controlled pressure regulation valve, interposed in the connection between the gas tank and the distribution manifold, and an electronic control unit configured to control opening and closing of each main gas injector, according to operating conditions of said gas feeding system, and according to operating conditions of the engine, for controlling said pressure regulation valve in order to establish a gas pressure in the gas distribution manifold, the gas pressure being determined according to the operating conditions of said gas feeding system and according to the operating conditions of the engine, and wherein:

the auxiliary gas injectors associated with the combustion pre-chambers are all in communication with said distribution manifold, downstream of said electronically-controlled pressure regulation valve, with reference to flow of the gas coming from the gas tank, said electronic control unit also being configured to control opening and closing of each of said auxiliary gas injectors, and said restricted passage is defined by a hole of a bushing inserted within said channel for auxiliary gas injection defined within said support body, said hole having a diameter (D) such that a D/V ratio between said diameter and a volume (V) of the combustion pre-chamber is between $3 \times 10^{-4}$ and $6 \times 10^{-4}$ mm$^{-2}$, thereby providing for passage of a gas flow proportional to the volume of the combustion pre-chamber.

2. The engine according to claim 1, wherein said support body comprises an upper portion and a lower portion, rigidly connected to each other to define the combustion pre-chamber, said upper portion of the support body having a cylindrical configuration and the cavity having a substantially cylindrical configuration, and said upper portion of the support body being received within the cavity formed in the cylinder head, wherein an outer surface of said upper portion has a circumferential groove that defines a circumferential chamber with a surface of said cylindrical cavity, said circumferential chamber communicating with the respective auxiliary gas injector by a second channel formed in the cylinder head, and wherein a second end of said auxiliary gas injection channel communicates with said circumferential chamber.

3. The engine according to claim 2, wherein said auxiliary gas injection channel extends through the upper portion of the support body and has:

a lower channel portion, opening out in the combustion pre-chamber, in which the bushing is inserted defining the restricted passage, and an upper channel portion opening out in said circumferential chamber, wherein which the non-return valve is inserted.

4. The engine according to claim 1, wherein the volume of the combustion pre-chamber is less than 3% of a volume of the main combustion chamber of each cylinder.

5. The engine according to claim 1, wherein the combustion pre-chamber has a main portion of elongated cylindrical shape, having an L/D ratio between its length (L) and its diameter (D) which is between 3 and 6.

6. The engine according to claim 5, wherein the orifices for communication between the combustion pre-chamber and the main combustion chamber are inclined with respect to a main axis of said elongated main portion of the combustion pre-chamber by an angle from 50° to 70°.

* * * * *